Figure 1:
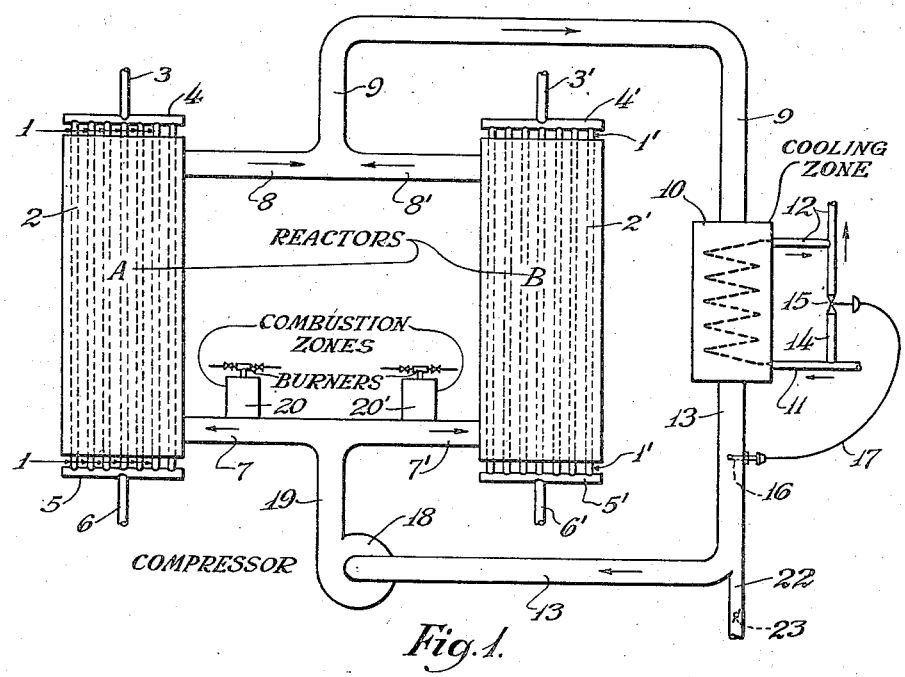

Nov. 20, 1945.  L. A. MEKLER  2,389,448
CONTROL OF REACTION TEMPERATURE IN ENDOTHERMIC
AND EXOTHERMIC REACTION
Filed Oct. 7, 1940

Inventor:
Lev A. Mekler
By Lee J. Gary
Attorney

Patented Nov. 20, 1945

2,389,448

UNITED STATES PATENT OFFICE 2,389,448

CONTROL OF REACTION TEMPERATURES IN ENDOTHERMIC AND EXOTHERMIC REACTIONS

Lev A. Mekler, Chicago, Ill., assignor to Universal Oil Products Company, Chicago, Ill., a corporation of Delaware Application October 7, 1940, Serial No. 360,054

9 Claims. (Cl. 23—1)

The invention relates to an improved method and means of controlling temperatures of simultaneously conducted endothermic and exothermic reactions which are accomplished in a plurality of reactors of the heat exchanger type, each reactor being alternately employed as a zone of endothermic reaction and a zone of exothermic reaction.

Processes of this general character ordinarily employ, in each reactor, one or a plurality of beds of contact material, such as catalyst capable, while in active state, of promoting the desired conversion reaction, the reactants being passed through said beds and provision being made for supplying heat to the reaction zone wherein the endothermic reaction is taking place and abstracting heat from the zone wherein the exothermic reaction is taking place by passing a convective fluid at suitable temperature in indirect heat transfer relation with each of the beds of contact material and with the reactants and conversion products flowing therethrough.

In order to obtain good thermal efficiency in such a system, it has been the practice to transfer heat evolved in the exothermic reaction to the endothermic reaction. In conventional practice, this is accomplished by establishing a continuous cyclic flow of convective fluid through the exothermic side of the system to the endothermic side and back to the exothermic side, with provision for increasing or decreasing the temperature of the convective medium, as required, during its passage from one side of the system to the other. With this conventional practice, when the zones of endothermic and exothermic reaction are alternated with respect to the several reactors employed, the direction of flow of the convective medium through at least a portion of the cycle is reversed in order that the convective medium will serve as a cooling medium in that side of the system to which the exothermic reaction has been transferred and as a heating medium in that side of the system to which the endothermic reaction has been transferred.

The present invention embodies a rather radical departure from the type of temperature control system above outlined. Like the above outlined system, it employs a plurality of reactors of the heat exchanger type, each of which is alternately in endothermic and exothermic operation and in two or more of which reactors the endothermic and exothermic reactions are simultaneously conducted. It also employs a circulating convective fluid for controlling temperatures in both the endothermic and exothermic phases of the system. However, instead of circulating the convective fluid in series through the reactors in endothermic and exothermic operation, the main stream of convective fluid is divided into a plurality of separate streams corresponding to the number of reactors simultaneously employed, said separate streams being passed through the several reactors in parallel. Upon leaving the reactors, the several streams of convective fluid are commingled and the commingled stream is cooled to or below the temperature required at the convective fluid inlet of the reactor whereto convective fluid is supplied at the lowest temperature. The commingled stream of cooled convective fluid is then divided into a plurality of separate streams, each of which is supplied to the reactor which it serves after its temperature has been readjusted to the desired value. Circulation of the convective fluid is accomplished by suitable propulsion means, such as a pump or compressor, operating upon the cooled convective fluid.

The heat abstracted from the commingled stream of convective fluid in cooling the same may be employed for any useful purpose, such as, for example, to preheat either or both streams of the reactants being supplied to the reactors in endothermic and exothermic operation, by employing one or more heat exchangers wherein the convective fluid being cooled and the material being heated are passed in indirect heat transfer relation, and the process may thereby be operated at a high degree of thermal efficiency.

The improved system of temperature control provided by the invention and above outlined may employ any desired type of convective medium whether solid, liquid, vaporous or gaseous at normal temperatures, so long as its physical and chemical characteristics otherwise meet the requirements of the process. It must, of course, have a melting point corresponding to or below the lowest temperatures encountered in the circuit and should be chemically stable or at least not susceptible to decomposition or deleterious reaction at the highest temperatures encountered in the circuit. To be most satisfactory, it should be substantially non-corrosive to the materials with which it comes in contact in the reactors and other portions of the circuit. For example, materials such as low melting point metals or metallic alloys, molten metal salts or salt mixtures, mixtures of diphenyl and diphenyl oxide, either eutectic or non-eutectic, as well as numerous normally liquid and normally gaseous materials, such as hydrocarbon liquids or gases, alcohols, glycerin, ethylene glycol, water, steam, relatively inert gases, such as combustion gases, carbon dioxide, nitrogen, etc., may each be suitable as the convective fluid in certain instances and may be selected in conformity with their known physical and chemical characteristics, the choice depending upon the conditions of service encountered in conducting the particular endothermic and exothermic reactions involved.

Neither is the invention limited to use in processes involving any specific class or type of endothermic and exothermic reactions, so long as they are simultaneously conducted, nor is it limited to operations in which the zones of endothermic and exothermic reactions are periodically shifted from one reactor to another, although it is particularly advantageous as applied to this type of operation.

Obviously, an attempt to illustrate, by drawing, and describe in detail all of the many possible adaptations and specific embodiments of the invention would tend to becloud rather than clarify its outstanding features and advantages. The subsequent description and the drawing will, therefore, be principally confined to two specific embodiments of the invention which are deemed adequately illustrative to teach the broader as well as the specific concepts of the invention claimed.

Fig. 1 of the drawing diagrammatically illustrates one specific embodiment of the invention wherein combustion gases are employed as the convective fluid.

Figure 2:
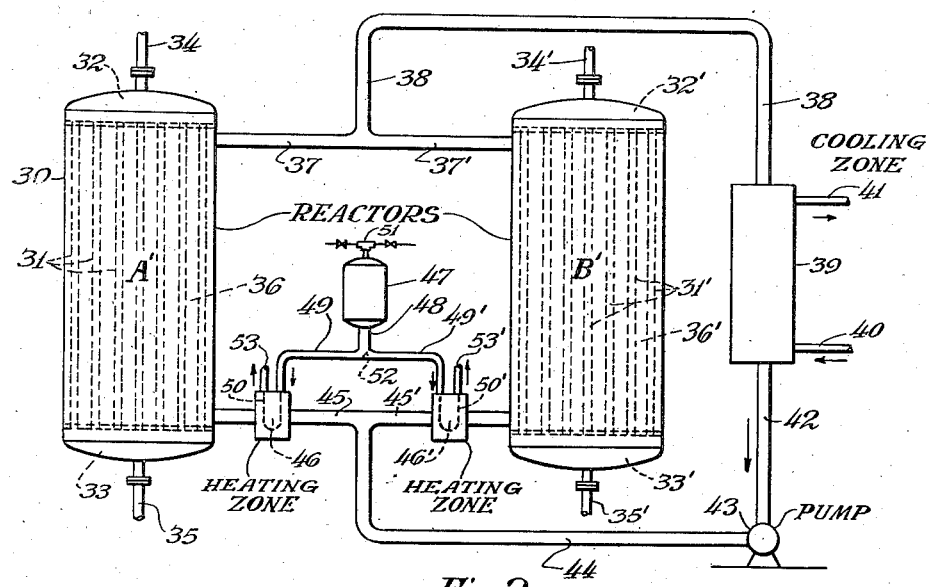

Fig. 2 diagrammatically illustrates another specific embodiment of the invention wherein a liquid is employed as the convective medium.

Referring to Fig. 1, two substantially identical reactors, designated by the reference letters A and B, are provided. The reactors comprise tubular elements 1 and 1', respectively, which extend through the respective jackets 2 and 2', the latter preferably being insulated, although insulation is not indicated in the drawing. Combustion gases, comprising the convective fluid employed in this particular instance, are circulated about the tubular elements within the reactor shells at temperatures regulated to maintain the desired reaction temperature within the tubes. Suitable contact material, such as granules or preformed shapes of solid catalyst, capable, while in active state, of promoting the endothermic reaction to be conducted may be disposed within the tubular elements 1 and 1'.

When reactor A is employed as the zone of endothermic reaction, the stream of reactants to be converted is supplied to the tubular elements 1 through line 3 and header 4 and passes as a plurality of separate smaller streams in parallel through the individual tubular elements and through the mass of contact material disposed therein. The resulting conversion products are discharged from the tubular elements 1 through header 5 and line 6 to separating and recovery equipment of any suitable conventional form, not illustrated.

In the particular type of conversion process now being considered, the exothermic reaction involves periodic reactivation of the catalyst or contact material. This is necessitated by accumulation in the catalyst bed of deleterious combustible material, such as carbon or heavy hydrocarbonaceous material deposited on the catalyst particles during the endothermic reaction, when the latter involves the conversion of hydrocarbons, such as in catalytic cracking or dehydrogenation.

When reactivation of the catalyst or contact material becomes necessary or desirable in the reactor which has been employed for conducting the endothermic reaction, the flow of the stream of hydrocarbon reactants to this reactor is discontinued and diverted to the other reactor which contains fresh or freshly reactivated catalyst. For example, when the catalyst in reactor A requires reactivation, the stream of hydrocarbon reactants to be converted is supplied to the tubes of reactor B through line 3' and header 4'. The hydrocarbon conversion reaction is then continued in reactor B by passage of the reactants through the tubes and the contact material disposed therein and the resulting conversion products are directed from tubes 1' of reactor B through header 5' and line 6' to the separating and recovery equipment from which the materials now leaving the reactor A have been diverted. This alternation of the zones of endothermic reaction may be accomplished in any well known manner by means of a suitable stream-directing mechanism or switching valves which do not constitute a novel part of the present invention and, to avoid unnecessary complexity, are not shown in the drawing.

During reactivation of the catalyst or contact material in reactor A, a stream of reactivating gases, such as, for example, combustion gases containing a regulated amount of free oxygen, or a mixture of steam and air, is supplied through line 3 and header 4 to tubes 1 and in passing therethrough contacts the combustible material deposited on the catalyst or contact mass and burns the same therefrom. The resulting spent or partially spent reactivating gases and combustion products are discharged from reactor A through header 5 and line 6 and may be discharged from the system or recirculated to line 3, in any well known manner, not illustrated, after proper purification, temperature adjustment and replenishment of their oxygen content.

Reactivation is accomplished in reactor B in the same manner, when the catalyst or contact material therein requires reactivation. The reactivating gas stream is introduced to tubes 1' through line 3' and header 4' and the resulting spent or partially spent reactivating gases and combustion products are discharged from tubes 1' through header 5' and line 6' and thence from the system or through the recirculating and reconditioning equipment back to line 3'.

Switching valves or any other suitable stream-directing mechanism, not illustrated, may be employed to accomplish diversion of the reactivating gas stream from one reactor to the other and periodic diversion of effluents from each reaction zone to their desired destination.

The system so far described with reference to the drawing is conventional and, except in combination with the features of the invention to be subsequently described, is not a novel part of the invention. Many modifications and variations with respect to the specific form of the reactors, switching mechanism and the like are possible without departing from the scope of the invention and will be apparent to those familiar with the art.

Assuming for the moment that the endotheric reaction is taking place in reactor A and the exothermic reaction in reactor B, necessitating the supply of heat to the former and abstraction of heat from the latter, two combustion gas streams, each adjusted to its required temperature level, as will be later described, are supplied through ducts 7 and 7' to the respective reactors A and B. The combustion gases supplied to reactor A pass through jacket 2 about tubes 1' and supply heat through the latter to the contact material or catalyst and to the reactants and conversion products passing therethrough. The combustion gases supplied to reactor B pass through jacket 2' about tubes 1' and abstract heat through the latter from the contact material or catalyst disposed therein and from the reactivating gases and the combustion products generated therein.

After being cooled in reactor A, the combustion gases which serve as the convective fluid in this zone are directed therefrom through the duct 8 and commingle in duct 9 with the heated combustion gases which have served as the convective medium in reactor B and which are discharged therefrom through duct 8'. The stream of commingled combustion gases from reactors A and B flows through duct 9 to cooling zone 10 wherein its temperature is reduced to or below the desired temperature of the combustion gas stream entering the reactor wherein it is required at the lower temperature level. It is entirely possible in some instances that so little heat will be generated in the exothermic reaction and imparted to the combustion gases which serve as the convective medium in the reactor wherein the exothermic reaction is taking place, or so little heat extracted from the gas stream which serves as the convective medium in the reactor wherein the endothermic reaction is taking place, that the temperature of the stream of commingled combustion gases from reactors A and B passing through duct 9 is at or below the required temperature of the convective fluid supplied to the reactor wherein it is utilized at the lower temperature level. In such instances, cooling zone 10 will not be required and may be eliminated or by-passed by well known means, not illustrated.

Cooling zone 10, in the particular case here illustrated, comprises a heat exchanger wherein the combustion gases supplied thereto from duct 9 pass in indirect heat transfer relation with a suitable cooling fluid, the latter being supplied to the heat exchanger through line 11 and discharged therefrom through line 12 and the resulting cooled combustion gases being directed therefrom through duct 13.

It is desirable to maintain the temperature of the cooled combustion gases discharged from zone 10 at a substantially constant value and, in the particular case here illustrated, this is accomplished by means comprising by-pass line 14, containing valve 15, through which communication is established between lines 11 and 12, and a temperature-sensitive device, such as thermostat 16, disposed in duct 13. The opening through valve 15 is automatically regulated in response to minor changes in the temperature of the cooled combustion gases passing through duct 13 by impulses generated in thermostat 16 and transmitted therefrom in the operating mechanism of the valve through line 17. Numerous types and specific forms of control equipment suitable for accomplishing this are now available and well known to the industry and a detailed description and illustration thereof is, therefore, deemed, superfluous. Valve 15 may, for example, be of the pressure-actuated type having a diaphragm or piston and cylinder or it may be of the electrically operated type having a motor or solenoid.

By regulation of the opening through valve 15, in the manner described, the quantity of cooling fluid supplied through line 11 to the heat exchanger is so regulated that the temperature of the cooled combustion gases passing through duct 13 is maintained substantially constant, the quantity of cooling fluid by-passed from line 11 through line 14 and valve 15 to line 12 being increased and decreased in inverse relation to the temperature of the combustion gases passing through duct 13.

By positioning control valve 15 in by-pass connecting lines 11 and 12, a substantially constant flow is insured through line 12 beyond the junction of the by-pass line. This is particularly advantageous when the cooling fluid employed in zone 10 comprises reactants or reactivating gases for use within the system, since it is desirable to supply a substantially constant volume of heated reactants to the reactor wherein the endothermic reaction is taking place and to supply a substantially constant volume of reactivating gases to the reactor wherein the exothermic reaction is taking place. When desired, and particularly when other cooling fluid is employed in zone 10 instead of the reactants to be converted or the reactivating gases, valve 15 may be disposed in line 11 or in line 12 and the by-pass line 14 may be eliminated.

The cooled combustion gases discharged from zone 10 through duct 13 are directed through the latter in regulated quantities to propulsion means 18 which may be of any desired type, such as a reciprocating or centrifugal compressor or a fan or blower, capable of maintaining circulation of the combustion gases at the desired rate. The stream of cooled combustion gases is discharged from the propulsion means through line 19 which joins ducts 7 and 7', a portion of the combustion gases passing from duct 19 through duct 7 to reactor A and another portion thereof passing from duct 19 through duct 7' to reactor B.

Combustion zones 20 and 20', disposed in or communicating with ducts 7 and 7', respectively, function to increase the temperature of either or both of the streams of combustion gases passing through the respective ducts 7 and 7' to the respective reactors A and B. Burners 21 and 21' supply fuel and air to the respective combustion zones 20 and 20' wherein the fuel is burned and the resulting freshly generated hot combustion gases from zones 20 and 20' commingle with the respective streams of cooler combustion gases passing through ducts 7 and 7' to the reactors.

To compensate for the quantity of freshly generated hot combustion gases added to the circulating stream or streams from combustion zone 20 or combustion zone 20', or both, and keep the quantity of combustion gases in the circuit substantially uniform, a substantially corresponding quantity of relatively cool combustion gases is discharged from the circuit through duct 22 communicating with duct 13 and regulated by damper 23 disposed therein. When desired, discharge duct 22 may communicate with duct 19 on the discharge side of the propulsion means 18 instead of duct 13 and any well known method and means, not illustrated, of recovering available residual heat from the gases discharged from the circuit through duct 22 may be employed within the scope of the invention.

The invention contemplates alternate operation of burners 21 and 21' with alternation of the zones of endothermic and exothermic reaction in order to heat either the stream of combustion gases passing through duct 7 or the stream of combustion gases passing through duct 7' without increasing the temperature of the other stream. This, however, does not preclude continuous operation of both burners in order to heat each of the two streams passing through ducts 7 and 7', since this method of operation is contemplated when the temperature of the stream of commingled combustion gases leaving zone 10 is lower than the temperature desired in the lowest temperature stream entering the reactor shells. Preferably, in order to avoid the necessity of periodically igniting and extinguishing the combustible mixture issuing from the burners, both burners may be operated continuously, one idling with a relatively low flame by admitting only a relatively small quantity of fuel and air thereto while larger quantities of fuel and air are admitted to the other burner, the idling periods being alternated with respect to the two burners when the zones of endothermic and exothermic reaction are shifted. It is, of course, also possible and entirely within the scope of the invention to employ burners of the off and on type, such as utilized, for example, in most domestic heating installations, although this necessitates the use of a pilot light or ignition system. In any event, since the desired temperature of the stream of combustion gases serving the reactor in endothermic operation will ordinarily be either appreciably higher or appreciably lower than the desired temperature of the stream of combustion gases serving the reactor in exothermic operation, the stream flowing through duct 7 is heated, by the addition thereto of hot combustion gases from zone 20 to a higher temperature than the stream flowing through duct 7' while the higher temperature stream is required about reactor A and the stream of combustion gases flowing through duct 7' is heated, by the addition thereto of fresh hot combustion gases from zone 20, to a higher temperature than the stream of combustion gases passing through duct 7, while the higher temperature stream is required about reactor B.

Regulation of the quantity of fuel and air supplied to burners 21 and 21' may be accomplished in any conventional manner and preferably, although not illustrated, the operation of the burner control mechanism is correlated with the operation of the switching mechanism which diverts the stream of reactants to be converted and the stream of reactivating gases from one reactor to the other. This is ordinarily accomplished by one of several well known types of time cycle controller which functions to bring the various switching, stream diverting or regulating valves into operation at predetermined time intervals during operation of the process. Such systems applied to various processes of the general type herein contemplated, such as, for example, catalytic cracking and catalytic dehydrogenation, are now well known to those familiar with the commercial operation of such processes. They do not form an essential part of the present invention and are not herein claimed since manual operation of the necessary switching, stream diverting or control valves may be employed. Their illustration is, therefore, omitted from the drawing.

However, an important feature of the invention, although it is not considered essential, resides in alternating the operation of the burners at a point in the operating cycle shortly preceding switching of the streams of reactants and reactivating gases between the reactors in endothermic and exothermic operation. This time interval may substantially correspond to or precede the period in each operating cycle during which the reactor which is about to be switched from exothermic to endothermic operation is purged of reactivating gases and combustion products. The short delay between alternation of the burners or other heating means associated with the reactors and switching of the streams of reactants and reactivating gases is advantageous in that, during this period, the reactor about to be shifted from endothermic to exothermic operation is preconditioned, as is also the reactor about to be shifted from exothermic to endothermic operation. In other words, at the time the switch is made the temperatures in the reactors have to be adjusted to levels suitable for conducting the reaction about to be initiated therein.

Referring to Fig. 2, the system here illustrated is quite similar in operation to that shown in Fig. 1 above described, except that it is adapted to use liquid as the convective medium rather than gases.

Two reactors A' and B' are shown in Fig. 2 although more than two may, of course, be employed, when desired. The respective reactors A' and B' have outer, liquid-tight shells 30 and 30', respectively, which are preferably constructed of or lined with a suitable metal or metallic alloy capable of withstanding the conditions of service to which the reactor is subjected. A plurality of tubular elements 31 and 31' are disposed within the respective reactor shells 30 and 30', tubes 31 of reactor A' communicating at their opposite ends with inlet and outlet compartments 32 and 33, while tubes 31' of reactor B' communicate at their opposite ends with inlet and outlet compartments 32' and 33'.

Each of the tubular elements within the reactors is adapted to contain a bed of solid granular contact material for catalyst which, while in active state, promotes the endothermic reaction to be conducted and upon which combustibles are deposited during the endothermic reaction and subsequently burned therefrom to restore the activity of the contact material.

Inlet and outlet conduits 34 and 35 are provided in opposite ends of reactor A' and communicate with the respective zones 32 and 33. During endothermic operation in reactor A', the fluid reactants to be converted are supplied, preferably in preheated state, to the inlet compartment of reactor A', pass through the tubular elements 31' in direct contact with the catalytically active contact material disposed therein and in indirect heat transfer relation with the convective liquid circulated through compartment 36 of the reactor in which the tubes are disposed, whereby heat is transferred from the convective liquid through the walls of the tubes to the contact material and the reactants undergoing conversion therein. The resulting fluid conversion products are discharged from the tubes of reactor A' to the outlet compartment thereof and through the communicating outlet conduit to subsequent separating and recovery equipment which is not a novel part of the present invention and is therefore not illustrated.

During exothermic operation or reactivation of contact material in reactor A', a stream of reactivating gases, such as air or relatively inert gases containing a controlled quantity of air or oxygen, is introduced, preferably in preheated state, through the inlet line to the inlet compartment of the reactor and flows through the tubular elements of the reactor in direct contact with the contaminated contact material from which it burns the combustible deposits. The resulting spent or partially spent reactivating gases and combustion products pass from tubes 31 to the outlet compartment of reactor A' and are discharged through the outlet conduit and suitable stream-diverting valves or other switching means, not illustrated, preferably to suitable heat recovery, reconditioning and recirculating equipment which does not form a novel part of the invention and is not illustrated. During reactivation of the contact material in reactor A, convective liquid is circulated through compartment 36 of the reactor about the tubes and absorbs heat through the walls of the latter from the contact material and hot products of combustion generated within the tubes, thereby preventing excessive temperature rise in the reactor during the reactivating period.

The operation of reactor B' is substantially the same as the operation of reactor A', reactants to be converted being admitted to the inlet compartment thereof through the communicating inlet conduit during the endothermic or processing step of the cycle, passed through the tubular elements 31' wherein conversion occurs and the resulting products discharged from the outlet compartment of the reactor through the communicating outlet line to the aforementioned separating and recovery equipment. Likewise, during exothermic operation or reactivation of the contact material in reactor B', the reactivating gas stream is supplied to the inlet compartment thereof through the communicating conduit, passes through the tubular elements of the reactor, burning the deposited combustible material from the contact mass and the resulting spent or partially spent reactivating gases and combustion products pass from the tubes to the outlet compartment wherefrom they are directed through the communicating conduit from the system or, preferably, to the aforementioned heat recovery, reconditioning and recirculating equipment. During endothermic operation in reactor B', convective liquid is circulated through compartment 36' thereof about tubes 31' at a temperature regulated to supply heat through the walls of the tubes to the contact mass and the reactants undergoing conversion therein. During exothermic operation in reactor B', convective liquid is circulating through compartment 36' of the reactor at a temperature regulated to abstract heat through the walls of the tubular elements from the contact mass undergoing reactivation and from the hot combustion products generated therein.

Like reactors A and B of Fig. 1, reactors A' and B' of Fig. 2 are alternately employed in endothermic and exothermic operation, conversion of the reactants being accomplished in one reactor while reactivation of the contact material is accomplished in the other.

The fluid employed as the convective medium leaves reactor A' through conduit 37 communicating with the upper portion of chamber 36 and the fluid leaving reactor B' passes through conduit 37', communicating with compartment 36'. The streams of liquid discharged from the two reactors commingle in conduit 38 through which they are directed to cooling zone 39, passing therethrough in indirect heat transfer relation with a suitable cooling fluid supplied thereto through line 40 and discharged therefrom through line 41. The convective liquid, which has been cooled in zone 39 to or below the temperature required for the convective liquid in the reactor wherein it is employed at the lowest temperature, is directed from zone 39 through conduit 42 to pump 43. It is fed therefrom through conduit 44 communicating with conduits 45 and 45'. A portion of the stream of convective liquid from conduit 44 flows through conduit 45 into compartment 36 of reactor A' and the remainder is directed through conduit 45' to compartment 36' of reactor B'.

Heating zones 46 and 46' are disposed in the respective conduits 45 and 45' and function to selectively reheat one or both of these streams to the required temperature prior to their introduction into the respective reactors. Like combustion zones 20 and 20' of Fig. 1, the reheating zones 46 and 46' of Fig. 2 may be alternately operated or they may operate continuously with periodic variation of the temperatures therein to satisfy the requirements of the reactors as the zones of endothermic and exothermic reaction are alternated between the latter.

The heating zones 46 and 46' may be of any suitable conventional form, such as heat exchangers, for example, through which any suitable heating medium is circulated in indirect heat transfer relation with the convective liquid.

Although not so limited, the invention specifically contemplates the use of hot combustion gases as the heating medium in zones 46 and 46' and the combustion gases may be generated in each of these zones in indirect heat transfer relation with the convective liquid passed therethrough. In the particular case here illustrated, however, a single combustion zone 47 is employed which communicates through duct 48 and the respective branches 49 and 49' with closed coils or other suitable heat exchange elements 50 and 50', respectively, in the respective heating zones 46 and 46'. Regulated quantities of fuel and air are supplied through burner 51 to combustion zone 47 and resulting freshly generated hot combustion gases are supplied from the combustion zone selectively to heating zone 46 or to heating zone 46' by regulation of a suitable damper or stream-directing member 52 disposed at the junction of ducts 48, 49 and 49'. The combustion gases which have given up heat to the convective fluid, in passing through heating zone 46 in indirect heat exchange therewith, are discharged therefrom through duct 53 and the combustion gases from zone 47 which have given up heat in zone 46' to the convective liquid, with which they pass in indirect heat transfer relation in this zone, are discharged therefrom through duct 53'.

In conjunction with the apparatus illustrated in Fig. 2, as in the case of that shown in Fig. 1 and above described, switching valves or any other suitable stream-directing mechanism, not illustrated, may be employed to accomplish periodic diversion of the stream of reactants to be converted and the reactivating gas stream from one reactor to the other, as well as to accomplish periodic diversion of the affluents from each reaction zone with respect to the aforementioned heat recovery, reconditioning and recycling equipment and the separating and recovery equipment.

As an example of one specific operation of the apparatus illustrated in Fig. 1 as applied to the catalytic cracking of hydrocarbon oil in essentially vaporous state for the production therefrom of high yields of good antiknock gasoline, the catalyst employed for promoting the cracking reaction comprises preformed porous shapes of a synthetically prepared material consisting predominantly of silica and alumina.

The oil to be converted is a substantially paraffinic gas oil which is quickly heated and substantially vaporized by well known means, not illustrated, the vapors being supplied at a temperature of approximately 935° F. to the reactor in endothermic operation wherein they contact the catalyst and are catalytically cracked. To maintain the desired conversion temperature in the reactor in endothermic operation, combustion gases which serve as the convective fluid are supplied thereto at a temperature of approximately 1300° F. and are cooled by the transfer of heat to the endothermic reaction to a temperature of approximately 1100° F. at which they emerge from the reactor.

After approximately sixty minutes of operation, the reactor in which the catalytic cracking operation has been taking place is substantially purged of reactants and conversion products by passing a stream of hot, substantially oxygen-free combustion gases therethrough. The purging operation requires only a few minutes and immediately thereafter a quantity of air, regulated to give an oxygen content of approximately 3% in the stream of hot combustion gases employed as purging medium, is added thereto and reactivation of the catalyst thus initiated. Reactivation of the catalyst to the desired extent is completed in slightly less than sixty minutes by continuing to pass the hot oxygen-containing gases through the catalyst bed at the required rate. The reactivating gas streams (hot oxygen-containing combustion gases) are supplied to the reactor in which reactivation is taking place at a temperature of approximately 875° F. and, to prevent an excessive temperature rise in the catalyst bed during reactivation, the combustion gas stream employed as the convective fluid in this reactor is supplied thereto at a temperature of approximately 800° F. It is heated during its passage through the reactor in indirect heat exchange with the materials undergoing reactivation to a temperature of approximately 900° F. at which it is discharged from the reactor.

During purging of the first reactor and reactivation of the catalyst therein, the stream of hot hydrocarbon vapors to be converted is supplied to the second reactor and passed therethrough in direct contact with the fresh or freshly reactivated catalyst disposed therein to continue the cracking operation. Reactivation of the catalyst in the first reactor is completed a few minutes before processing of the hydrocarbon vapors is completed in the second reactor and the first reactor is then substantially purged of oxygen-containing gases by discontinuing the supply of air to the reactivating gas stream and continuing to pass the substantially oxygen-free combustion gases through the reactor. After this purging period the stream of heated hydrocarbon vapors to be converted is diverted back to the first reactor and the second reactor is substantially purged of fluid hydrocarbon reactants and conversion products in the manner above described, following which the contaminated catalyst in the second reactor is reactivated in the same manner as above described, while the cracking reaction continues in the first reactor. Thus, a complete operating cycle is established which involves a processing period, a purging period, a reactivating period and another purging period in each reactor. The operation may thus be continued indefinitely.

The combustion gases employed as the convective fluid and discharged from the reactor in endothermic operation at a temperature of approximately 1100° F., are commingled in duct 9 with the combustion gases employed as the convective fluid in the reactor in exothermic operation and leaving this reactor at a temperature of approximately 900° F. The temperature of the commingled stream of combustion gases supplied through duct 9 to cooling zone 10 is approximately 975° F. Its temperature is reduced in the cooling zone to a temperature of approximately 800° F. These relatively cool gases are supplied by the propulsion means from the cooling zone to ducts 7 and 7' where the stream is divided. The stream flowing through one of the last named ducts to the reactor in endothermic operation is heated by the addition thereto of hot combustion gases from combustion zone 20 or 20', as the case may be, to a temperature of approximately 1300° F., while the stream being supplied through the other ducts 7 or 7' to the reactor in exothermic operation is not appreciably heated, the burner associated with the communicating combustion zone simply idling and this stream of gases entering the reactor in exothermic operation at a temperature of approximately 800° F. A quantity of cooled combustion gases regulated to compensate for the quantity of hot combustion gases added to the cycle from combustion zone 20 or 20', as the case may be, is continuously removed from duct 13 and from the cycle through duct 22 regulated by damper 23.

It will be apparent from the above description that the improved system of temperature control provided is extremely simple in operation and is much more positive and trouble-free than previous systems of this general class and possesses several advantages thereover. The complete absence of expensive and cumbersome switching valves for the convective fluid is one important advantage. The improved system obviates any reversal of flow in all or any portion of the convective fluid cycle. The propulsion means operates continuously in one direction at a substantially constant speed and handles the convective fluid at substantially the coolest point in the cycle. The temperature of the commingled stream of convective fluid entering the cooling zone is substantially constant throughout the entire operating cycle, which materially simplifies maintaining a substantially constant temperature in the stream of convective fluid leaving the cooling zone. All that is necessary, so far as the convective fluid cycle is concerned, to alternate the reactors in endothermic and exothermic operation, is to alternate the operation of the burners which supply fuel and air to combustion zones 20 and 20'.

The system illustrated in Fig. 2, which employs a liquid rather than a gas as the convective fluid for maintaining the desired processing and reactivating temperatures, retains the above mentioned advantages of the system illustrated in Fig. 1, except that heating of the stream of convective fluid supplied to the reactor requiring the highest temperature stream thereof is accomplished by indirect heat exchange rather than by direct commingling of the hot combustion gases with the stream.

To further illustrate the operation of the system shown in Fig. 2 and at the same time to illustrate suitable conditions for a different type of conversion reaction, we will assume that the apparatus illustrated is employed for the catalytic dehydrogenation of butane to produce substantial yields of butadienes. The catalyst employed in this particular instance consists of synthetically prepared solid porous particles consisting predominantly of alumina and chromia.

The charging stock for the dehydrogenating operation consists predominantly of normal butane which is supplied to the reactor in endothermic operation at a temperature of approximately 1150° F. and is dehydrogenated therein in contact with the active catalytic material. To maintain the desired reaction temperature in the reactor in endothermic operation, the convective liquid, which is a molten salt consisting essentially of sodium chloride and aluminum chloride in substantially equal molar portions, is circulated about the tubular elements of the reactor. The temperature of the molten salt entering is approximately 1200° F. and it leaves the reactor at approximately 1190° F.

The reactors are alternated in endothermic and exothermic operation in the same manner as previously described in conjunction with Fig. 1 and periodic reactivation of the catalyst and purging of the reactors is accomplished in the same manner. To prevent an excessive temperature rise in the reactor wherein the exothermic reaction (reactivation of the catalyst) is taking place, a stream of the same molten salt is supplied thereto at a temperature of approximately 900° F. and it leaves this reactor at a temperature of approximately 920° F.

The streams of molten salt leaving reactors A' and B' commingle in conduit 38, the temperature of the commingled stream being approximately 1050° F. It is supplied to cooling zone 39 wherein its temperature is reduced to approximately 900° F. and it is supplied by pump 43 from the cooling zone to ducts 45 and 45' wherein it is again divided into two streams, one of which is heated to approximately 1200° F. and supplied to the reactor in endothermic operation, while the other stream is supplied without appreciable change in temperature to the reactor in exothermic operation.

I claim as my invention:

1. The method of controlling temperatures in reactions simultaneously conducted at different temperature levels in a plurality of separate reaction zones which comprises, passing a separate stream of convective fluid, each at the required temperature, in indirect heat transfer relation with the reactants undergoing conversion in each of said reaction zones, subsequently commingling said separate streams, cooling the entire commingled stream to a temperature at least as low as that of the coolest of said separate streams, dividing the cooled stream of convective fluid into a plurality of separate streams, and selectively reheating and supplying the divided streams, each at its required temperature, to said reaction zones as aforesaid, said reheating being accomplished by heat from a source independent of said reaction zones.

2. The method of controlling temperatures in endothermic and exothermic reactions simultaneously conducted in separate reaction zones which comprises, passing a stream of convective fluid about the zone of endothermic reaction at a temperature regulated to impart heat from the convective fluid to the reactants undergoing endothermic conversion therein, simultaneously passing a separate stream of convective fluid about the zone of exothermic reaction at a temperature regulated to abstract heat from the reactants undergoing exothermic conversion therein, subsequently commingling said separate streams, cooling the entire commingled stream to a temperature at least as low as that of the coolest of said separate streams, dividing the cooled stream of convective fluid into separate streams, and selectively reheating and supplying the divided streams each at its required temperature to said reaction zones as aforesaid, said reheating being accomplished by heat from a source independent of said reaction zones.

3. The method of controlling temperatures in endothermic and exothermic reactions simultaneously conducted in separate reaction zones which comprises, passing a stream of convective fluid about the zone of endothermic reaction at a predetermined relatively high temperature to impart heat to the reactants undergoing conversion therein, simultaneously passing a separate stream of convective fluid about the zone of exothermic reaction at a predetermined lower temperature to abstract heat from the reactants undergoing conversion therein, subsequently commingling said separate streams, cooling the entire commingled stream to a temperature substantially corresponding to that of the second mentioned stream, dividing the cooled stream into separate streams, reheating one of the last named streams to the required temperature and passing it as the first named stream about the endothermic reaction zone and supplying another of the last named streams without substantial change in temperature to about the endothermic reaction zone as the second named stream, said reheating being accomplished by heat from a source independent of said reaction zones.

4. The method of controlling temperatures in endothermic and exothermic reactions simultaneously conducted in separate reaction zones which comprises, passing a stream of convective fluid about the zone of endothermic reaction at a predetermined relatively high temperature to impart heat to the reactants undergoing conversion therein, simultaneously passing a separate stream of convective fluid about the zone of exothermic reaction at a predetermined lower temperature to abstract heat from the reactants undergoing conversion therein, subsequently commingling said separate streams, cooling the entire commingled stream to a temperature below that of said separate stream supplied to the exothermic reaction zone, dividing the cooled stream into separate streams, selectively reheating the latter to the respective temperatures required in the first and second named streams and recycling them as said first and second named streams about the respective reaction zones, said reheating being accomplished by heat from a source independent of said reaction zones.

5. In a process wherein endothermic and exothermic reactions are simultaneously conducted in separate reaction zones with periodic alternation of the zones of endothermic and exothermic reaction between separate reactors, the method of controlling the reaction temperatures in said reactors which comprises, passing a stream of convective fluid through the reactor in endothermic operation, in indirect heat transfer relation with the reactants undergoing conversion therein, at a temperature and rate regulated to impart the desired heat thereto and maintain the desired reaction temperature, simultaneously passing a separate stream of convective fluid through the reactor in exothermic operation, in indirect heat transfer relation with the reactants undergoing conversion therein, at a temperature and rate regulated to remove excess heat from the reaction zone and maintain the desired reaction temperature therein, subsequently commingling said separate streams, cooling the entire commingled stream to a temperature substantially corresponding to that of the stream of convective fluid supplied to the reactor employing the lowest temperature convective fluid, dividing the cooled stream into separate streams, supplying one of said separate streams to each reactor and, prior to its introduction into the reactor which it serves, selectively reheating to the required temperature that one of the last named streams which is supplied to the reactor employing the convective fluid at the highest temperature, said reheating being accomplished by heat from a source independent of said reaction zones.

6. In a process wherein endothermic and exothermic reactions are simultaneously conducted in separate reaction zones with periodic alternation of the zones of endothermic and exothermic reaction between separate reactors, the method of controlling temperatures in the reaction zones which comprises, passing a separate stream of convective fluid through each reactor in indirect heat exchange relation with the reactants undergoing conversion therein, supplying the stream of convective fluid to the reactor in endothermic operation at a higher temperature than the stream of convective fluid supplied to the reactor in exothermic operation, commingling said separate streams of convective fluid subsequent to their passage about the zones of endothermic and exothermic operation, cooling the entire commingled stream to substantially the temperature at which convective fluid is supplied to the reactor in exothermic operation, dividing the cooled stream into separate streams, continuously supplying one of the latter to each of said reactors to serve therein as the first named separate streams and reheating the stream supplied to the reactor in endothermic operation to its required temperature by alternate heating of the divided streams in conformity with alternation of the zones of endothermic and exothermic reaction, said reheating being accomplished by heat from a source independent of said reaction zones.

7. An apparatus of the class described comprising a plurality of reactors each having a zone in which to conduct a reaction with means for admitting reactants thereto and means for removing reaction products therefrom, each reactor having a fluid passageway for the passage of convective fluid therethrough in indirect heat exchange relation with the reactants and conversion products passing through the reaction zone, conduits leading from adjacent one end of the fluid passageway in each reactor to adjacent one end of a common conduit, a cooler at an intermediate point in said common conduit, branch conduits leading from adjacent the opposite end of the common conduit to adjacent the opposite end of the fluid passageway in each reactor, propulsion means disposed between the cooler and said branch conduits for effecting the circulation of convective fluid through said reactors, and a heater associated with each of said branch conduits.

8. An apparatus of the class described comprising a plurality of reactors each having a zone in which to conduct a reaction with means for admitting reactants thereto and means for removing reaction products therefrom, each reactor having a fluid passageway for the passage of convective fluid therethrough in indirect heat exchange relation with the reactants and conversion products passing through the reaction zone, conduits leading from adjacent one end of the fluid passageway in each of said reactors to adjacent one end of a common conduit, a cooler at an intermediate point in said common conduit, branch conduits leading from adjacent the opposite end of the common conduit to adjacent the opposite end of the fluid passageway in each of said reactors, propulsion means disposed between the cooler and said branch conduits for effecting the circulation of convective fluid through said reactors, and burner means associated with each of said branch conduits for selectively supplying heat to the convective fluid passing therethrough.

9. An apparatus of the class described comprising a plurality of reactors each having a zone in which to conduct a reaction with means for admitting reactants to be converted thereto and means for discharging conversion products therefrom, each reactor having a passageway for the circulation of convective fluid therethrough in indirect heat transfer relation with the reactants and conversion products passing through the reaction zone, branch outlet ducts connecting said fluid passageways with a common duct, branch inlet ducts leading from said common duct to said fluid passageways, a cooler in said common duct between its points of juncture with the branch inlet ducts and the branch outlet ducts, propulsion means for said convective fluid disposed in said common duct between the cooler and said branch inlet ducts, and burner means in each of said branch inlet ducts.

LEV A. MEKLER.